(12) United States Patent
Bataille

(10) Patent No.: US 12,450,846 B2
(45) Date of Patent: Oct. 21, 2025

(54) MIXED-REALITY COMMUNICATION METHOD, COMMUNICATION SYSTEM, COMPUTER PROGRAM, AND INFORMATION MEDIUM

(71) Applicant: Orange, Issy-les-Moulineaux (FR)

(72) Inventor: Guillaume Bataille, Chatillon (FR)

(73) Assignee: Orange, Issy-les-Moulineaux (FR)

(*) Notice: Subject to any disclaimer, the term of this patent is extended or adjusted under 35 U.S.C. 154(b) by 146 days.

(21) Appl. No.: 18/565,333

(22) PCT Filed: May 30, 2022

(86) PCT No.: PCT/FR2022/051009
§ 371 (c)(1),
(2) Date: Nov. 29, 2023

(87) PCT Pub. No.: WO2022/254135
PCT Pub. Date: Dec. 8, 2022

(65) Prior Publication Data
US 2024/0303940 A1    Sep. 12, 2024

(30) Foreign Application Priority Data
May 31, 2021    (FR) ...................................... 2105727

(51) Int. Cl.
*G06T 19/00*    (2011.01)
(52) U.S. Cl.
CPC .................. *G06T 19/006* (2013.01)

(58) Field of Classification Search
None
See application file for complete search history.

(56) References Cited

PUBLICATIONS

Wang Peng et al., 3DGAM: using 3D gesture and CAD models for training on mixed reality remote collaboration:, Multimedia Tools and Applications, Kluwer Academic Publishers, Boston, US, vol. 80, No. 20, Sep. 2, 2020, pp. 31059-31084.
Ohan Oda et al., "Virtual Replicas for Remote Assistance in Virtual and Augmented Reality", Proceedings of the 28th Annual ACM Symposium on User Interface Software & Technology, UIST '15, ACM Press, New York, USA, Nov. 5, 2015, pp. 405-415.

(Continued)

*Primary Examiner* — Nicholas R Wilson
(74) *Attorney, Agent, or Firm* — Knobbe, Martens, Olson & Bear, LLP

(57) ABSTRACT

A method for communication between a first mixed-reality terminal and a second mixed-reality terminal via a communication network, the method including the following: transmitting by the first terminal of a first user to the second terminal of a second user: a first virtual character generated on the basis of data relating to the first user and captured by the first terminal, a first virtual object generated on the basis of data relating to a first real object and captured by the first terminal, and a second virtual object consisting of a duplicate of the first virtual object generated at a given time, the second virtual object being modifiable by interaction of the second user; and transmitting by the second terminal to the first terminal a second virtual character generated by the second terminal of the second user on the basis of captured data.

12 Claims, 3 Drawing Sheets

(56) References Cited

PUBLICATIONS

He Zhenyi et al., "CollaboVR: A Reconfigurable Framework for Creative Collaboration in Virtual Reality", Nov. 1, 2020, pp. 542-554, 2020 IEEE International Symposium on Mixed and Augmented Reality (ISMAR).

Tuomas Kantonen et al., "Mixed reality in virtual world teleconferencing", Virtual Reality Conference (VR), 2010 IEEE, IEEE, Piscataway, NJ, USA, Mar. 20, 2010, pp. 179-182.

International Search Report for International Application No. PCT/FR2022/051009, dated Sep. 16, 2022.

MIXED-REALITY COMMUNICATION METHOD, COMMUNICATION SYSTEM, COMPUTER PROGRAM, AND INFORMATION MEDIUM

CROSS-REFERENCE TO RELATED APPLICATIONS

This application is filed under 35 U.S.C. § 371 as the U.S. National Phase of Application No. PCT/FR2022/051009 entitled "MIXED-REALITY COMMUNICATION METHOD, COMMUNICATION SYSTEM, COMPUTER PROGRAM, AND INFORMATION MEDIUM" and filed May 30, 2022, and which claims priority to FR 2105727 filed May 31, 2021, each of which is incorporated by reference in its entirety.

BACKGROUND

Technical Field

This development relates to a method for mixed-reality remote communication and an associated communication system. The development also relates to a computer program and an information medium.

Prior Art

Mixed-reality remote collaboration tools generally use a first-person view of the remote person's environment, which adversely affects the quality of interpersonal communication because the parties cannot see their collaborator. Indeed, interpersonal communication is considered optimal when the communicating parties are face to face and can see each other's facial expressions.

An example of a virtual reality headset is the HoloLens™ headset. This virtual reality headset makes it possible to generate avatars which are reproduced in a virtual environment superimposed on the real environment of the person wearing the virtual reality headset. The headset captures the position of the head, hands, and eyes, and generates holographic images that move the avatar according to the captured positions. However, the avatars' faces remain frozen.

It is also known to create prototypes of virtual reality service platforms such as the platform called Mesh™. This platform offers holoportation, which is a holographic reproduction of the person wearing the headset, in a virtual environment. This platform allows sharing a virtual environment displayed in augmented reality in which several individuals can take part remotely via their avatar. The individuals can manipulate only virtual objects in a single shared virtual space.

This platform should allow an individual to visualize the gestures made by a remote individual and mimic them. However, this tool does not allow manipulating real objects. Only virtual objects are manipulated.

SUMMARY

A first aim of this development is to propose a method for communication which facilitates remote communication.

A second aim of this development is to propose a method for communication which facilitates the training of at least one person remotely in relation to an object to be manipulated.

To this end, one object of the development is a method for communication between at least a first mixed-reality terminal and a second mixed-reality terminal, via a communication network, the method comprising at least:

the first terminal of a first user transmits to the second terminal of a second user at least: a first virtual character generated on the basis of data relating to the first user and captured by the first terminal,
  a first virtual object generated on the basis of data relating to at least one first real object and captured by the first terminal, and
  a second virtual object consisting of a duplicate of the first virtual object generated at a given time, the second virtual object being modifiable by interaction of at least the second user; and
the second terminal transmits to the first terminal at least one second virtual character generated by at least the second terminal of the second user on the basis of captured data.

Advantageously, the first terminal transmits to the second terminal an object that can be modified by the latter.

The features set forth in the following paragraphs may optionally be implemented. They may be implemented independently of each other or in combination with each other.

The first and second mixed-reality terminals respectively comprise at least one first and second mixed-reality headsets and at least one first and second sensors, the method comprising the steps of:

the at least one first sensor captures data representative of the first user and data representative of a real object;
the at least one first virtual reality headset generates said at least one first virtual character representing the first user, said at least one first virtual object representing the real object, and said at least one second virtual object representing the real object at a given time, based on data captured by the at least one first sensor;
the at least one second virtual reality headset projects said at least one first virtual character, said at least one first virtual object, and said at least one second virtual object which were generated;
the at least one second sensor captures data representative of the movements of the at least one second user;
the second virtual reality headset generates a third virtual object by modifying the second virtual object based on data captured by the at least one second sensor, in order to represent the real object manipulated by the at least one second user at a later time.

Advantageously, the second user P2 can remotely manipulate the virtual object representing the real object. The fact that the second user P2 can manipulate a virtual representation of the real object will help the first user P1 with learning the gesture in the same manner as if the two people were physically present in the same room.

Advantageously, in the event of any danger, the second user P2 can intervene remotely and prevent a possible accident.

Advantageously, the second user can train the first user even if the second user does not have access to the real object.

The method further comprises:
the third virtual object is transmitted from the second virtual reality headset to the first virtual reality headset, via the communication network;
the first virtual reality headset projects the third virtual object.

Advantageously, the first user P1 can watch the second user P2 manipulating the real object and can adapt his learning to what he is seeing. For example, an apprentice sees his trainer's manipulations on the third virtual object and can attempt to reproduce it on the real object.

The second virtual object is projected between the at least one first virtual object and the second virtual reality headset.

Advantageously, the second virtual object I2 is projected to be within reach of the second user P2 so that the latter can manipulate the virtual representation of the real object if necessary.

The method further comprises:
the at least one second sensor captures data representative of the at least one second user;
the second communication terminal generates at least one second virtual character representing the at least one second user, based on data captured by the at least one second sensor;
the second virtual reality headset projects the generated at least one second virtual character.

Advantageously, the first user can visualize the second user P2 who is remote.

The first virtual character represents a person viewed from the front.

Advantageously, communication is improved. As the first user is viewed from the front, the second user can see his or her facial expressions, understand his or her emotional state, and adapt the communication accordingly.

Advantageously, the second remote user does not see an avatar but holographic images representing the first user.

The method further comprises:
the first virtual reality headset saves at least one second virtual character representing the at least one second user, and the third virtual object representing the real object being manipulated;
the first virtual reality headset projects at least one second virtual character and the third virtual object which were saved.

Advantageously, the first user can review the training received in order to memorize it.

The method further comprises:
the at least one second virtual reality headset saves at least one first virtual character representing the first user, and the first virtual object representing the real object,
the at least one second virtual reality headset projects at least one first virtual character and the first virtual object which were saved.

Advantageously, the second user can review manipulations previously performed by the first user in order to indicate, for example, the moment where the manipulation needs improvement.

At least one virtual object is composed of a series of holographic images.

The development also relates to a communication system comprising a communication network, a first communication terminal, and at least one second communication terminal, the communication system being adapted for implementing the method mentioned above.

The development also relates to a computer program comprising instructions for implementing a method for communication as mentioned above, when loaded and executed by a microprocessor.

Lastly, the development relates to an information medium readable by a microprocessor, comprising the instructions of a computer program for implementing a method for communication as mentioned above.

DETAILED DESCRIPTION OF CERTAIN ILLUSTRATIVE EMBODIMENTS

To simplify one's understanding of the development, the communication system and the method for communication have been represented and described with two users. However, the development is applicable to all data exchanges involving a larger number of users.

In the embodiment shown and described, the first user is the user to be trained and the second user is the trainer. However, the method for communication can also be applied in a context where the first user is the trainer and the second user is the user being trained. The communication system also allows the exchange of audio data by means of a microphone mounted in the virtual reality headsets. This exchange of audio data is known per se and is not described in this patent application.

Figure 1:
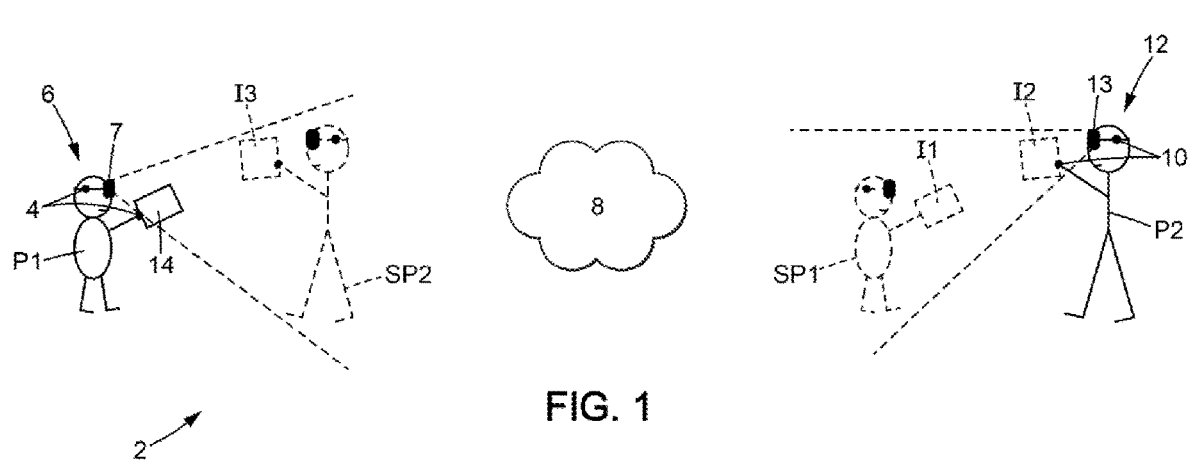
FIG. 1 is a diagram representing a communication system according to this development.

With reference to FIG. 1, an example of a communication system 2 adapted for implementing the development comprises a first communication terminal 6 or communication server, a communication network 8, and at least one second communication terminal 12 or communication server.

First communication terminal 6 is for example composed of at least one first sensor 4 and a first virtual reality headset 7 worn by first user P1.

Second communication terminal 12 is for example composed of at least one second sensor 10 and a second virtual reality headset 13 worn by the at least one second remote user P2. In the embodiment shown, but in no way limiting, first communication terminal 6 and second communication terminal 12 respectively comprise the first and second sensors.

First sensors 4 are capable of capturing images representing first user P1 and a real object 14 located near first user P1 which this user is able to manipulate. In particular, the first sensors are able to capture very precisely the movements of the chest, arms, hands, fingers, as well as the facial expression of the person wearing them. The first sensors may optionally comprise at least one camera capable of capturing images representing second user P2. The first sensors may further comprise other cameras with other angles of view and/or motion sensors. The first sensors further comprise a communication interface which allows them to transmit the captured digital data to first communication terminal 6.

Second sensors 10 are capable of capturing images representing second user P2 and data representative of the gestures and movements of the second user. They are also adapted to transmit the captured digital data to second communication terminal 12, via communication network 8. They are identical or similar to the first sensors and will not be described again.

First virtual reality headset 7 comprises a processor, as well as a camera, memory, coherent light source, and microphones which are all connected to the processor. The processor comprises a synthetic holographic image generator, a network interface, and a communication interface capable of receiving data from the first sensors. The synthetic holographic image generator is capable of generating virtual objects composed of a series of holographic images. First virtual reality headset 7 is similar to the HoloLens™ virtual reality headsets. It will not be described in detail. Second virtual reality headset 13 is similar to the first virtual reality headset. Its communication interface is adapted to receive data from the second sensors.

Mixed reality is the fusion of real and virtual worlds in order to produce new environments and visualizations, where physical and digital objects coexist and interact in real time. Mixed reality does not take place exclusively in the physical or virtual world, but is a hybrid of reality and virtual reality, encompassing both augmented reality and augmented virtuality by means of immersive technology.

Communication network 8 is for example an Internet network. In this context, the exchanges are in accordance with the Internet protocol.

In this patent application, a user is a real person as opposed to a virtual person who is either an avatar of the real person or a hologram of the real person. In particular, first user P1 and second user P2 are adult or child individuals capable of wearing a virtual reality headset and first sensors or second sensors. First user P1 can manipulate a real object 14. This real object may for example be a new machine tool to be implemented in a company or at a production site. Real object 14 may also be a musical instrument such as a violin or any other accessory item. The second user is located remotely from the first user. The term "remote" can be understood as a large enough distance that the first and second users cannot hear and see each other. The first user may be located in one country and the second user in a different country several thousand kilometers from the first user. The first user and second user may be in the same building but in different rooms.

Figure 2:
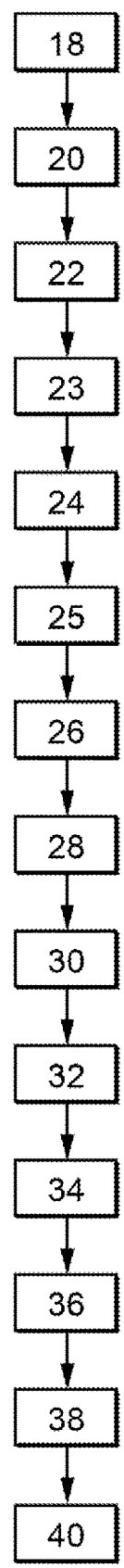
FIG. 2 is a flowchart representing the steps of the method for communication of the development.

With reference to FIG. 2, the method for communication according to the development begins with a step 18 during which first virtual reality headset 7 is configured for the vision and optical characteristics of first user P1 who is wearing it. The manner of implementing this configuration is known per se. It essentially consists of detecting the pupil of the wearer of the virtual reality headset in order to be able to generate and project virtual characters and virtual objects in the wearer's field of view at the desired distance. In the same manner, second virtual reality headset 13 is configured for the vision and optical characteristics of second user P2 who is wearing it.

The method continues in a step 20 during which first sensors 4 capture data relating to first user P1, and in particular data relating to the representation of first user P1, the movements of this user, and data representative of real object 14 possibly manipulated by first user P1.

Simultaneously, during a step 22, second sensors 10 capture data relating to second user P2, and in particular data relating to the representation of second user P2.

During a step 23, the data captured by first sensors 4 are transmitted to first virtual reality headset 7. Then, first virtual reality headset 7 generates, at a given time T1, a first virtual character SP1 representing first user P1, a first virtual object I1 representing real object 14, and a second virtual object I2 representing real object 14, based on the data captured by the first sensors. Second virtual object I2 is identical to first virtual object at given time T1.

Preferably, first virtual character SP1 represents first user P1.

More preferably, first virtual character SP1 represents first user P1 from the front.

Communication is improved as a result. Indeed, the second user can see the facial expressions of the first user, understand his or her emotional state, and adapt communications accordingly.

Alternatively, first virtual character SP1 represents an avatar previously saved in memory and selected by the first user.

Alternatively, the data captured by first sensors 4 are transmitted to second virtual reality headset 13 and it is second virtual reality headset 13 which generates first virtual character SP1, first virtual object I1, and second virtual object I2.

During a step 24, first virtual character SP1, first virtual object I1, and second virtual object I2 are transmitted from first communication terminal 6, and in particular from first headset 7, to second communication terminal 12, and in particular to second headset 7, via communication network 8.

During a step 25, second sensors 10 transmit the captured data to second virtual reality headset 13. Second virtual reality headset 13 generates a second virtual character SP2 representing second user P2.

During a step 26, the second terminal, in particular second headset 13, transmits to first terminal 6, and in particular to first headset 7, the generated second virtual character SP2.

Alternatively, the data captured by second sensors 10 are transmitted to first virtual reality headset 7 and it is first virtual reality headset 7 which generates first virtual character SP1, first virtual object I1, and second virtual object I2.

During a step 28, the second virtual reality headset 13 projects 28 the generated at least one second virtual character SP2. During a step 30, second virtual reality headset 13 projects first virtual character SP1 representing the first user, first virtual object I1, and second virtual object I2 representing the real object at a given time T1. Second virtual object I2 is projected between first virtual object I1 and the second virtual reality headset. Preferably, second virtual object I2 is projected at a distance less than or equal to 1 meter from the second virtual reality headset. Thus, advantageously, second virtual object I2 is projected to be within reach of the second user so that the second user (the trainer) very clearly sees the virtual representation of the real object and can manipulate it if necessary.

During a step 32, second sensors 10 capture data representative of the movements of second user P2.

During a step 34, second communication terminal 12, and in particular second headset 13, generates a third virtual object I3 at a later time T2 by modifying second virtual object I2 to represent the real object manipulated by second user P2. Third virtual object I3 is generated based on data captured by first sensors 4 and data captured by second sensors 10.

Thus, the second user (the trainer) can manipulate the representations of the real object and can virtually move the real object. For this purpose, the second sensors capture the movements of second user P2 and in particular the movements of his or her arms and fingers. The data representative of these gestures and movements are transmitted to the processor of second virtual reality headset 13. Based on these data, the processor calculates what the successive positions of the real object would be if it had been manipulated by these movements. Second virtual reality headset 13 generates third virtual object I3 representing the real object manipulated by second user P2, based on the data captured by the second sensors, to represent virtually the movements of the real object if it were subjected to the manipulations captured by second sensors 10. Second virtual object I2 thus represents the real object manipulated by second user P2.

During a step 36, second communication terminal 12, and in particular second headset 13, transmits to first communication terminal 6, and in particular to first headset 7, the data which allow generating third virtual object I3 representing the virtual object manipulated by second user P2.

During a step 38, second virtual reality headset 13 projects third virtual object I3 generated during step 34, as well as first virtual character SP1 representing the first user and first virtual object I1 representing the real object.

During a step 40, first virtual reality headset 7 projects third virtual object I3 representing the real object, based on the data transmitted by the second communication terminal during step 36, as well as second virtual character SP2 representing the second user manipulating the real object, based on the data generated during step 25. Thus, first user P1 can visualize second user P2 (the trainer) who is remote and who is manipulating the real object.

Advantageously, second user P2 can remotely manipulate second virtual object I2 representing the real object. The fact that the second user can manipulate a virtual representation of the real object will help first user P1 in learning the gesture in the same manner as if both people were physically in the same room. In addition, in the event of any danger, second user P2 can intervene remotely and prevent a possible accident.

All of steps 20 to 40 take place simultaneously during the communication and exchanges between first user P1 and second user P2.

Figure 3:
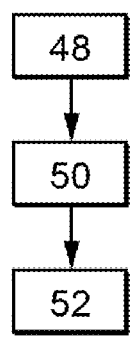
FIG. 3 is a flowchart representing optional additional steps of the method for communication according to the development.

With reference to FIG. 3, the method for communication may possibly include a request to save step 48 by first user P1. This request can be made by a voice request from the first user or by the first user pressing a button on first communication terminal 6.

Step 48 continues with a step 50 of saving, in the memory of first communication terminal 6, second virtual character SP2 representing the second user and the third virtual object I3 representing the moving object.

Step 50 may subsequently be followed by a step 52 of projection, by first virtual reality headset 7, of the second virtual character SP and the virtual object that were saved.

Advantageously, the first user can review the training received in order to memorize it.

Figure 4:
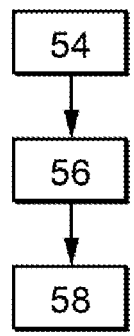
FIG. 4 is a flowchart representing optional additional steps of the method for communication according to the development.

With reference to FIG. 4, in the same manner, the method for communication may possibly include a request to save step 54 by second user P2. This request can be made by a voice request from the second user or by the second user pressing a button on second communication terminal 12.

Step 54 continues with a step 56 of saving, in the memory of second communication terminal 12, first virtual character SP1 representing first user P1 and first virtual object I1 representing the real object.

Step 56 may optionally continue with a step 58 of projection, by second communication terminal 12, of the first virtual character SP1 and the virtual object that were saved.

Advantageously, second user P2 can review manipulations previously carried out by first user P1 in order to indicate, for example, the moment where the manipulation needs improvement. Advantageously, at least first virtual character SP1 or second virtual character SP2 is composed of a series of holographic images.

The invention claimed is:

1. A method of communication between at least a first mixed-reality terminal and a second mixed-reality terminal, via a communication network, the method comprising at least the following:
    transmitting by the first terminal of a first user to the second terminal of a second user at least:
        a first virtual character generated on the basis of data relating to the first user and captured by the first terminal,
        a first virtual object generated on the basis of data relating to at least one first real object and captured by the first terminal, and
        a second virtual object comprising a duplicate of the first virtual object generated at a given time, the second virtual object being modifiable by interaction of at least the second user; and
    transmitting by the second terminal to the first terminal at least one second virtual character generated by at least the second terminal of the second user on the basis of captured data.

2. The method of communication according to claim 1, wherein the first and second mixed-reality terminals respectively comprise at least one first and second mixed-reality headsets and at least one first and second sensors, the method comprising:
    capturing by the at least one first sensor data representative of the first user and data representative of a real object;
    generating by the at least one first virtual reality headset the at least one first virtual character representing the first user, the at least one first virtual object representing the real object, and the at least one second virtual object representing the real object at a given time, based on data captured by the at least one first sensor;
    projecting by the at least one second virtual reality headset the at least one first virtual character, the at least one first virtual object, and the at least one second virtual object which were generated;
    capturing by the at least one second sensor data representative of the movements of the at least one second user; and
    generating by the second virtual reality headset a third virtual object by modifying the second virtual object based on data captured by the at least one second sensor, in order to represent the real object manipulated by the at least one second user at a later time.

3. The method of communication according to claim 2, which further comprises:
    transmitting the third virtual object from the second virtual reality headset to the first virtual reality headset, via the communication network; and
    projecting by the first virtual reality headset the third virtual object-.

4. The method of communication according to claim 2, wherein the second virtual object is projected between the at least one first virtual object and the second virtual reality headset.

5. The method of communication according to claim 2, which further comprises:
    capturing by the at least one second sensor data representative of the at least one second user;
    generating by the second communication terminal at least one second virtual character representing the at least one second user, based on data captured by the at least one second sensor; and
    projecting by the second virtual reality headset the generated at least one second virtual character.

6. The method of communication according to claim 2, which further comprises:
- saving by the first virtual reality headset at least one second virtual character representing the at least one second user, and the third virtual object representing the real object manipulated; and
- projecting by the first virtual reality headset at least one second virtual character and the third virtual object which were saved.

7. The method of communication according to claim 1, wherein the first virtual character represents a person viewed from the front.

8. The method of communication according to claim 1, which further comprises:
- saving by the at least one second virtual reality headset at least one first virtual character representing the first user, and the first virtual object representing the real object, and
- projecting by the at least one second virtual reality headset at least one first virtual character and the first virtual object which were saved.

9. The method of communication according to claim 1, wherein at least one virtual object is composed of a series of holographic images.

10. A communication system comprising a communication network, a first communication terminal, and at least one second communication terminal, the communication system being adapted for implementing the method according to claim 1.

11. A processing circuit comprising a microprocessor and a memory, the memory storing program code instructions of a computer program for implementing the method for communication according to claim 1, when loaded and executed by the microprocessor.

12. A non-transitory information medium readable by a microprocessor, comprising code instructions of a computer program for implementing the method for communication according to claim 1.

* * * * *